US010623319B1

(12) United States Patent
Talnikov et al.

(10) Patent No.: US 10,623,319 B1
(45) Date of Patent: Apr. 14, 2020

(54) LOAD REBALANCING IN A NETWORK-BASED SYSTEM

(71) Applicant: Amazon Technologies, Inc., Seattle, WA (US)

(72) Inventors: Andrey Vasilyevich Talnikov, Seattle, WA (US); Andrew Gary Hourselt, Seattle, WA (US); Yang Xu, Seattle, WA (US); Douglas Stewart Laurence, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 709 days.

(21) Appl. No.: 14/868,263

(22) Filed: Sep. 28, 2015

(51) Int. Cl.
*H04L 12/803* (2013.01)
*H04L 29/08* (2006.01)

(52) U.S. Cl.
CPC ........ *H04L 47/125* (2013.01); *H04L 67/1017* (2013.01); *H04L 67/145* (2013.01)

(58) Field of Classification Search
CPC .. H04L 47/125; H04L 67/1017; H04L 67/145
See application file for complete search history.

(56) References Cited

U.S. PATENT DOCUMENTS

| 6,581,104 | B1* | 6/2003 | Bereiter | H04L 45/24 |
| | | | | 709/232 |
| 6,862,618 | B1* | 3/2005 | Gray | H04L 45/00 |
| | | | | 370/468 |
| 8,073,934 | B1* | 12/2011 | Zhong | H04L 69/40 |
| | | | | 709/220 |
| 8,589,524 | B1* | 11/2013 | Sella | H04L 41/5041 |
| | | | | 709/221 |
| 8,812,727 | B1 | 8/2014 | Sorenson, III | |
| 9,055,076 | B1 | 6/2015 | Sorenson, III | |
| 2001/0049741 | A1* | 12/2001 | Skene | G06F 9/505 |
| | | | | 709/232 |
| 2002/0032777 | A1* | 3/2002 | Kawata | H04L 67/1008 |
| | | | | 709/226 |
| 2003/0208600 | A1 | 11/2003 | Cousins | |
| 2004/0003029 | A1* | 1/2004 | Islam | G06F 9/505 |
| | | | | 709/203 |

(Continued)

OTHER PUBLICATIONS

U.S. Appl. No. 13/864,152, filed Apr. 16, 2013, Sorenson, III.

(Continued)

*Primary Examiner* — Jael M Ulysse
(74) *Attorney, Agent, or Firm* — Robert C. Kowert; Kowert, Hood, Munyon Rankin & Goetzel, P.C.

(57) ABSTRACT

A load shedding mechanism and an endpoint selection mechanism may be used to rebalance loads of endpoints of a network-based service. The load shedding mechanism may monitor health information of one or more endpoints and determine whether to perform a load shedding operation based on the health information. In response to determining to perform the load shedding operation for a selected endpoint, the load shedding mechanism may, prior to a client close request for a keep-alive connection of the selected endpoint, trigger an early close of the keep-alive connection. In response to a corresponding client attempting to reconnect based at least in part on the early close, the endpoint selection mechanism may select another endpoint to form a keep-alive connection with the client.

21 Claims, 12 Drawing Sheets

(56) References Cited

U.S. PATENT DOCUMENTS

| | | | |
|---|---|---|---|
| 2004/0268358 A1* | 12/2004 | Darling | H04L 29/06 718/105 |
| 2006/0242298 A1* | 10/2006 | McAfee | H04L 67/1029 709/226 |
| 2006/0291400 A1* | 12/2006 | Balasaygun | H04L 29/06 370/242 |
| 2007/0073891 A1* | 3/2007 | Foltan | H04M 7/1255 709/230 |
| 2008/0281973 A1* | 11/2008 | Yang | H04L 29/12273 709/228 |
| 2008/0317060 A1* | 12/2008 | Balasaygun | H04L 29/06 370/437 |
| 2009/0135837 A1* | 5/2009 | Mohaban | H04L 63/029 370/400 |
| 2010/0281169 A1 | 11/2010 | Charles | |
| 2010/0332657 A1* | 12/2010 | Elyashev | H04L 67/1002 709/226 |
| 2010/0332658 A1* | 12/2010 | Elyashev | G06F 9/505 709/226 |
| 2011/0122768 A1* | 5/2011 | George | H04L 41/145 370/228 |
| 2012/0213124 A1* | 8/2012 | Vasseur | H04L 41/12 370/255 |
| 2013/0054682 A1* | 2/2013 | Malik | H04W 4/001 709/203 |
| 2013/0117455 A1* | 5/2013 | Shabtay | H04L 67/1008 709/227 |
| 2013/0246641 A1* | 9/2013 | Vimpari | H04L 47/10 709/228 |
| 2013/0286837 A1* | 10/2013 | Khanchi | H04L 47/127 370/235 |
| 2014/0068044 A1 | 3/2014 | McKinney et al. | |
| 2014/0310390 A1 | 10/2014 | Sorenson, III | |
| 2014/0310391 A1 | 10/2014 | Sorenson, III | |
| 2014/0310417 A1 | 10/2014 | Sorenson, III | |
| 2014/0310418 A1 | 10/2014 | Sorenson, III | |
| 2014/0330976 A1* | 11/2014 | van Bemmel | H04L 67/1023 709/226 |
| 2015/0052373 A1* | 2/2015 | Gatta | H04L 12/12 713/320 |
| 2015/0381771 A1* | 12/2015 | Fletcher | H04L 69/16 709/203 |
| 2016/0261478 A1* | 9/2016 | Navasivasakthivelsamy | H04L 43/10 |
| 2016/0323791 A1* | 11/2016 | Theogaraj | H04W 36/10 |
| 2017/0013508 A1* | 1/2017 | Pallas | H04W 28/08 |

OTHER PUBLICATIONS

U.S. Appl. No. 13/864,148, filed Apr. 16, 2013, Sorenson, III.
U.S. Appl. No. 13/864,145, filed Apr. 16, 2013, Sorenson, III.
U.S. Appl. No. 13/927,851, filed Jun. 26, 2013, Das, et al.
U.S. Appl. No. 14/175,895, filed Feb. 7, 2014, McCullagh.

* cited by examiner

LOAD REBALANCING IN A NETWORK-BASED SYSTEM

BACKGROUND

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store (e.g., a virtualized database) which may be distributed across multiple data storage devices or storage nodes, with each such virtualized data store acting as a distinct logical data store that provides users with the illusion that they are the sole operators and administrators of the data storage resource.

As the scale and scope of network-based applications and network-based services such as virtualized or cloud computing services have increased, network-based applications or services may include hundreds or even thousands of hardware or software nodes to which client traffic from many clients of the service or application may need to be load balanced. In an example data center or network implementing a large-scale service or application, multiple load balancers in a load balancer layer may front a fleet of nodes, with each load balancer fronting a subset of the nodes. Client connections to the service or application may be pseudo-randomly distributed among the load balancers in the load balancer layer, for example by a Domain Name Server (DNS) accessible by the clients that provides the IP addresses of the load balancers to the clients upon request. Connections from clients (e.g., Transmission Control Protocol (TCP) connections) may thus be established to particular load balancers; the load balancer to which particular client connections are established may distribute client traffic on those connections among its respective nodes according to a load balancing technique.

Load balancers are typically single, dedicated devices that include multiple network interface controllers (NICs), for example eight NICs, with some of the NICs handling inbound traffic from/outbound traffic to clients and the other NICs handling outbound traffic from/inbound traffic to the nodes that are being load balanced. Bandwidth or throughput on conventional load balancers is typically in the range of 40 Gigabits per second (Gbps) on the client side and 40 Gbps on the server side. Load balancers typically use techniques such as max connections (or max conns), round robin, and/or least connections (least conns) applied to data collected from the host devices to select which node will handle a connection. In addition, load balancers typically serve as proxies to the nodes that they front and thus terminate connections from the clients and send the client traffic to the nodes on connections established between the nodes and the load balancer. Thus, a node and a client typically do not communicate over a direct connection when using load balancers.

Figure 1A:
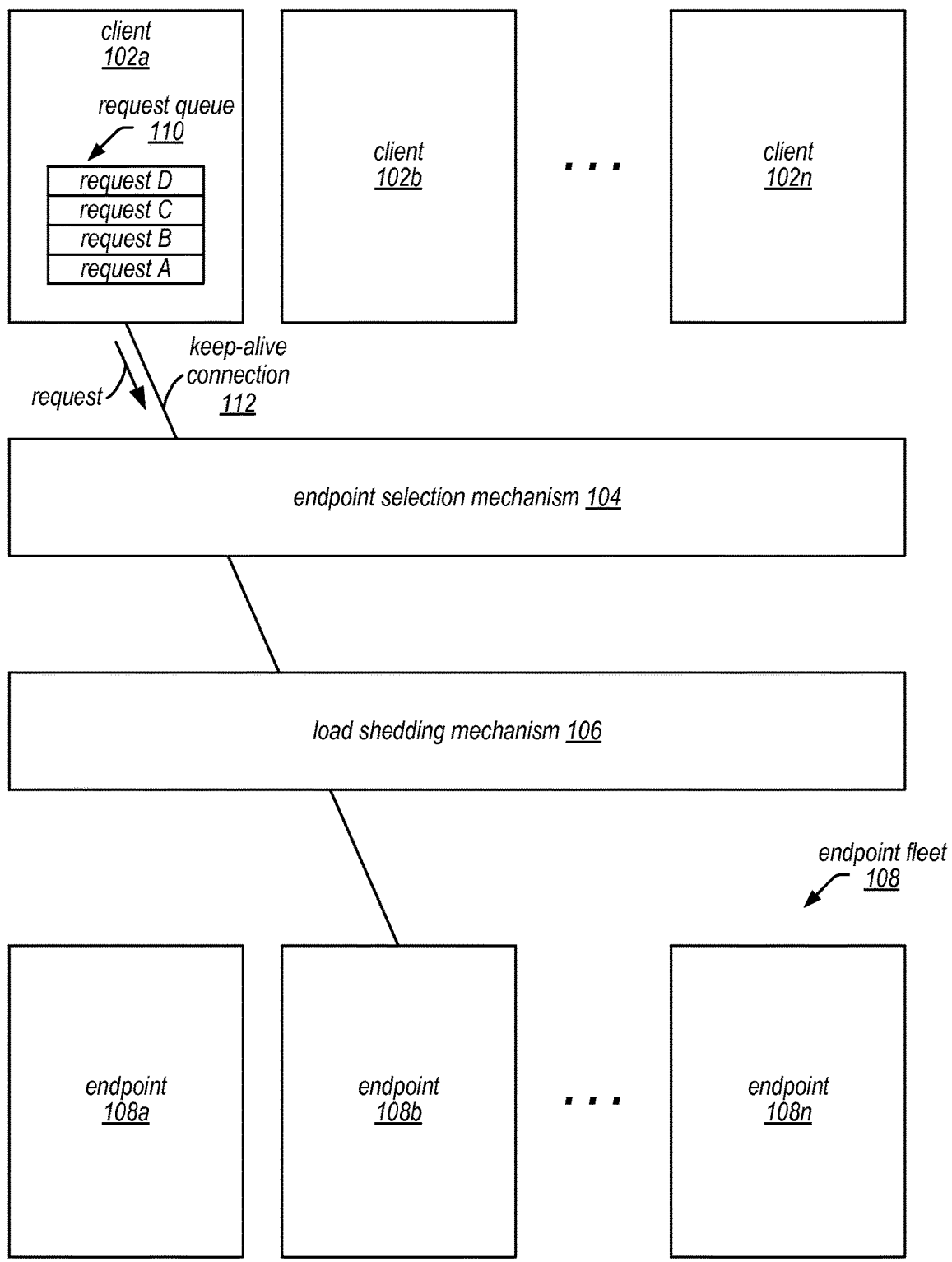
FIG. 1A is a block diagram illustrating a portion of an operation of an example system that rebalances loads of endpoints of a network-based service.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

In some cases, requests of clients of a network-based service may place larger loads on some endpoints as compared to other endpoints despite an endpoint selection mechanism (e.g., a load balancer). For example, one set of client requests assigned to one endpoint may be computationally intensive for the endpoint to fulfill, as compared to another set of client requests assigned to another endpoint. Accordingly, even if client requests are distributed across endpoints evenly by the endpoint selection mechanism, some endpoints may be overloaded. Additionally, many clients request keep-alive connections that the clients may use to send a plurality of requests to respective endpoints. Keep-alive connections are generally maintained until the respective client requests a close of the keep-alive connection. Varying amounts of requests from various clients may further result in imbalanced loads at the endpoints despite the endpoint selection mechanism. Imbalanced loads may result in longer wait times for clients connected to overloaded endpoints.

The systems and methods described herein may provide a network-based service that sheds load from overloaded endpoints using a load shedding mechanism and reassigns client keep-alive connections according to the endpoint selection mechanism. In some embodiments, the load is shed in a non-disruptive manner (e.g., a manner in which an associated client does not interpret as an error). In many cases, the client keep-alive connections may be reassigned such that the clients connect to different endpoints of the network-based service, either by probabilistic reassignment or by preventing clients from recreating a keep-alive connection that was just closed. Although portions of this disclosure are written using terminology of the hypertext transfer protocol (HTTP) (e.g., keep-alive connections), other protocols (e.g., other protocols usable to create a persistent connection between a client and an endpoint) may instead be used for some or all communications described herein.

As described in more detail herein, the network-based service includes an endpoint selection mechanism that may select an endpoint to receive and process client requests and a load shedding mechanism that may identify overloaded endpoints and cause clients to disconnect from the overloaded endpoints. The network-based service may service a current set of client requests more quickly, as compared to a network-based service that does not include a load shedding mechanism. Additionally, the network-based service may suffer fewer endpoint hardware failures, as compared to a network-based service where load is not shed from overloaded endpoints.

The endpoint selection mechanism and the load shedding mechanism may be implemented in a same group of one or more computer devices or may be implemented on different groups of one or more computer devices. Additionally, the endpoint selection mechanism and the load shedding mechanism may be distributed amongst multiple computer devices. For example, a portion of the load shedding mechanism that identifies overloaded endpoints may be implemented on one computer device and a portion of the load shedding mechanism that causes clients to disconnect from the overloaded endpoints may be implemented on another computer device. As described further below, the one or more computer devices may also perform other functions (e.g., load balancing) within the network-based service. Although specific configurations of the network-based service are described herein, combinations of portions of the configurations described herein are also contemplated.

Figure 1B:
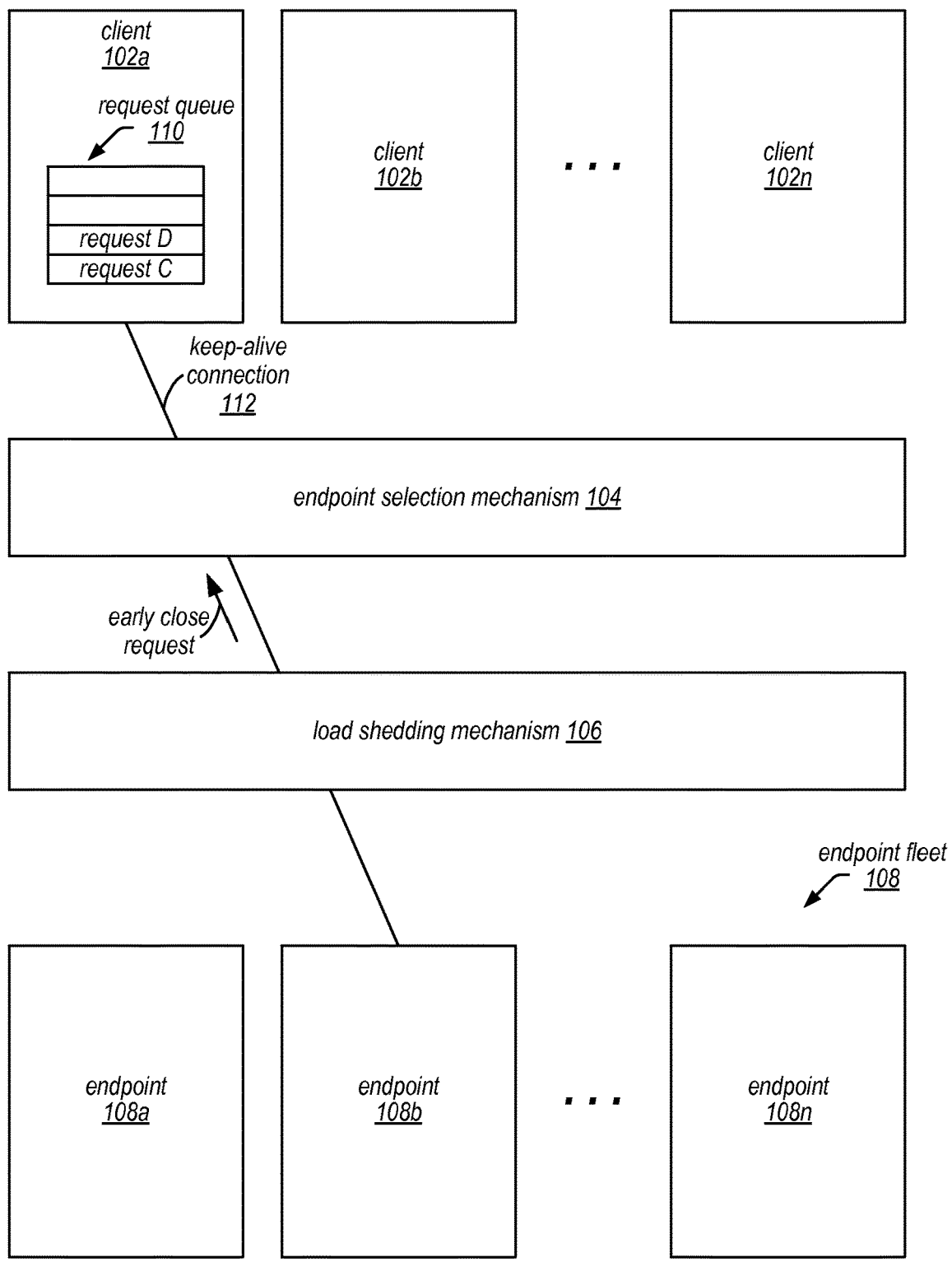
FIG. 1B is a block diagram illustrating a portion of an operation of an example system that rebalances loads of endpoints of a network-based service.
Figure 1C:
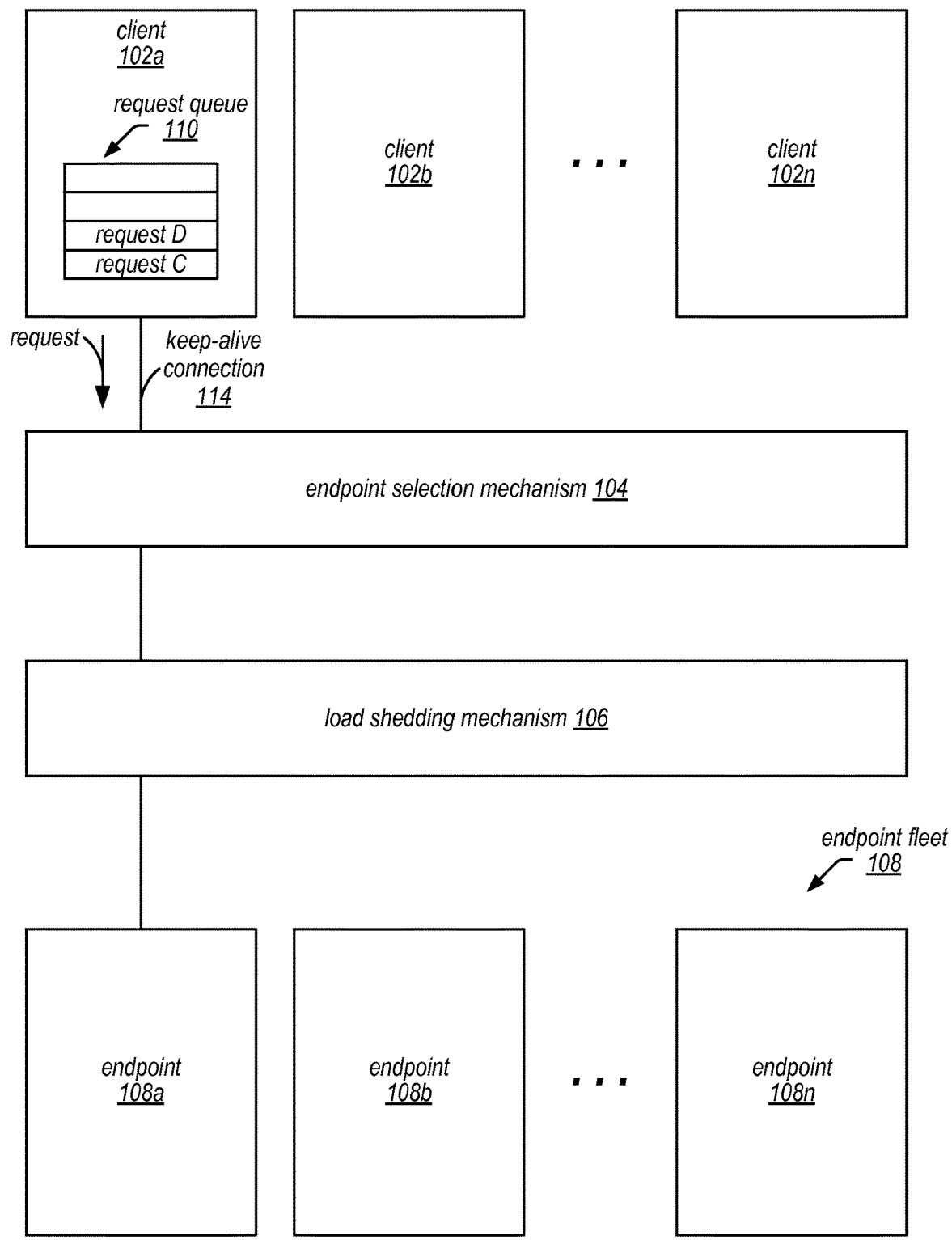
FIG. 1C is a block diagram illustrating a portion of an operation of an example system that rebalances loads of endpoints of a network-based service.

FIGS. 1A-1C are block diagrams illustrating operations of an example system that rebalances loads of endpoints of a network-based service. In this example, the system includes a plurality of clients 102a-n, an endpoint selection mechanism 104, a load shedding mechanism 106, and a plurality of endpoints 108a-n of an endpoint fleet 108. A client 102a includes a request queue 110 and is connected to an endpoint 108b via a keep-alive connection 112. As further described below with reference to FIG. 2, in some embodiments, the endpoints and the load shedding mechanism 106 are part of the network-based service. Additionally, in some embodiments, some or all of the endpoint selection mechanism 104 may be part of the network-based service. Alternatively, as described further below, in other embodiments, the endpoint selection mechanism 104 may not be part of the network-based service (e.g., may be part of a client device or a third party discovery service).

The network-based service may include the endpoint fleet 108 performing processing in response to requests from clients of the network-based service. In some cases, clients request keep-alive connections to endpoints to facilitate the clients sending multiple requests to a respective endpoint such that the client does not need to go through a connection process to make each request. In the illustrated embodiment of FIG. 1A, the keep-alive connection 112 has been formed between the client 102a and the endpoint 108b. Accordingly, the client 102a may send requests (e.g., may sequentially send requests A-D from the request queue 110) to the endpoint 108b via the keep-alive connection 112 and the endpoint 108b may perform processing in response to the requests.

As discussed above, a load (e.g., a processing load) at the endpoint 108b may vary over time. The load shedding mechanism 106 may monitor health information for the endpoint 108b and may determine whether to perform a load shedding operation at the endpoint 108b based at least in part on the health information. Several non-limiting, exemplary factors that the health information may include in various embodiments are described below. As illustrated in FIG. 1B, prior to the client 102a requesting an early close of the keep-alive connection 112, in response to determining to perform the load shedding operation, the load shedding mechanism 106 may trigger an early close of the keep-alive connection 112. For example, the load shedding mechanism 106 may inject an early close request into a message from endpoint 108b to client 102a. In some embodiments, the message may be sent in response to a request from client 102a (e.g., request B). As described further below, in some embodiments, at least a portion of the load shedding mechanism 106 may be included in the endpoint 108b. Accordingly, in some cases, the endpoint 108b may include the early close request in the message. In other embodiments, another portion of the network-based service may include the early close request in the message (e.g., by opening and modifying the message). In some cases, the early close request may be included in the message by replacing a "connection keep-alive" tag with a "connection close" tag in a header of the message. For example, a Keep-Alive connection-token specifying a Connection: Keep-Alive option may be replaced with a connection-token close specifying a Connection: close option in a Connection general-header field of the message. In various embodiments, the endpoint 108b may be configured to close a series of keep-alive connections in sequence (e.g., until the health information indicates that keep-alive connections should no longer be closed, until a particular number of keep-alive connections are closed, until a maximum number of keep-alive connections are closed, or any combination thereof).

In response to the early close request, the client 102a may close the keep-alive connection 112. In some embodiments, if the early close request is included along with a response to a request from the client 102a and prior to the client 102a sending another request using the keep-alive connection 112, the client 102a may interpret the early close request as a request to reconnect with the network-based service. The client 102a may not interpret the early close request as an error and the early close request may not result in a failure of a request from the client 102a. Accordingly, load shedding using the early close request may be a non-disruptive process. Subsequent to closing the keep-alive connection, the client 102a may request a keep-alive connection with the network-based service (e.g., to fulfill requests C and D). The endpoint selection mechanism 104 may select another endpoint of the endpoint fleet 108 (e.g., using a round robin-based selection mechanism, a pseudo-random-based selection mechanism, a least connections-based selection mechanism, etc.). Accordingly, in some cases, the endpoint 108b may be reselected to form a keep-alive connection with the client 102a. However, depending on how the endpoint selection mechanism 104 operates, such a circumstance may be unlikely.

In the embodiment illustrated by FIG. 1C, the endpoint selection mechanism 104 may select the endpoint 108a for the keep-alive connection 114. In the illustrated embodiment, the endpoint 108a completes processing of the requests in the request queue 110. In response to the request queue 110 being emptied, the client 102a may terminate the keep-alive connection 114. Accordingly, the system may rebalance loads of the endpoint fleet 108.

Exemplary Health Information Factors

In various embodiments, the health information may include one or more factors. The factors may generally indicate that the endpoint 108b is overloaded. Various non-limiting examples of the factors are provided below. These factors may be utilized independently or in combination. In some embodiments, different devices (e.g., different devices that include portions of the load shedding mechanism 106) may monitor different factors. Additionally, in some embodiments, the health information may be utilized without knowledge of loads at other endpoints of the endpoint fleet 108. In other embodiments, the load shedding mechanism 106 may be aware of one or more other endpoints of the endpoint fleet 108 that are not overloaded (e.g., indicating that load balancing would be effective).

In some embodiments, if one or more processors at the endpoint 108b are being utilized more frequently or at a higher utilization rate (e.g., a higher processor load) than a corresponding utilization threshold, the load shedding mechanism 106 may decide to perform a load shedding operation at the endpoint 108b. In some embodiments, if an amount of available bandwidth at the endpoint 108b is below a bandwidth threshold or if an amount of bandwidth devoted to the client 102a exceeds another bandwidth threshold, the load shedding mechanism 106 may decide to perform a load shedding operation at the endpoint 108b.

In some embodiments, if a latency (e.g., an average latency over a particular period of time or a latency in response to a particular request) exceeds a latency threshold, the load shedding mechanism 106 may decide to perform a load shedding operation at the endpoint 108b. In some embodiments, if a connection establishment time (e.g., an amount of time needed to establish a keep-alive connection with a client) of the endpoint 108b exceeds a connection establishment rate threshold, the load shedding mechanism 106 may decide to perform a load shedding operation at the endpoint 108b. In some embodiments, if a packet loss rate of the endpoint 108b exceeds an error rate threshold, the load shedding mechanism 106 may decide to perform a load shedding operation at the endpoint 108b. In some embodiments, if an input/output error rate of the endpoint 108b exceeds an error rate threshold, the load shedding mechanism 106 may decide to perform a load shedding operation at the endpoint 108b.

In some embodiments, if a number of processes running at the endpoint 108b exceeds a process count threshold, the load shedding mechanism 106 may decide to perform a load shedding operation at the endpoint 108b. In some embodiments, if a percentage of messages of a particular type (e.g., error messages) being sent on the keep-alive connection 112 exceeds a particular message type threshold, the load shedding mechanism 106 may decide to perform a load shedding operation at the endpoint 108b. In some embodiments, if a temperature of the endpoint 108b (e.g., a physical temperature of a server that implements the endpoint 108b) exceeds a temperature threshold (e.g., because the endpoint 108b is constantly processing computationally intensive requests), the load shedding mechanism 106 may decide to perform a load shedding operation at the endpoint 108b.

In some embodiments, if an estimated request fulfillment time associated with the endpoint 108b exceeds a fulfillment threshold, the load shedding mechanism 106 may decide to perform a load shedding operation at the endpoint 108b. Accordingly, as described further below, the load shedding mechanism 106 may have a way of evaluating an estimated request fulfillment time of the endpoint 108b (e.g., by looking at a queue of waiting requests) and may perform the load shedding operation in response to a current request if the load shedding mechanism 106 decides the estimated request fulfillment time is too large. As previously noted, the load shedding mechanism 106 may be unaware of loads at other endpoints of the endpoint fleet 108. Accordingly, the load shedding operation may result in a particular request taking longer for the network-based service to process (e.g., because the connection time and wait time using a new keep-alive connection may exceed a wait time using the keep-alive connection 112). However, in some embodiments, the load shedding mechanism 106 may be aware of loads at other endpoints of the endpoint fleet 108 and thus may be able to more accurately assess whether a load shedding operation will take longer than maintaining the keep-alive connection.

Figure 2:
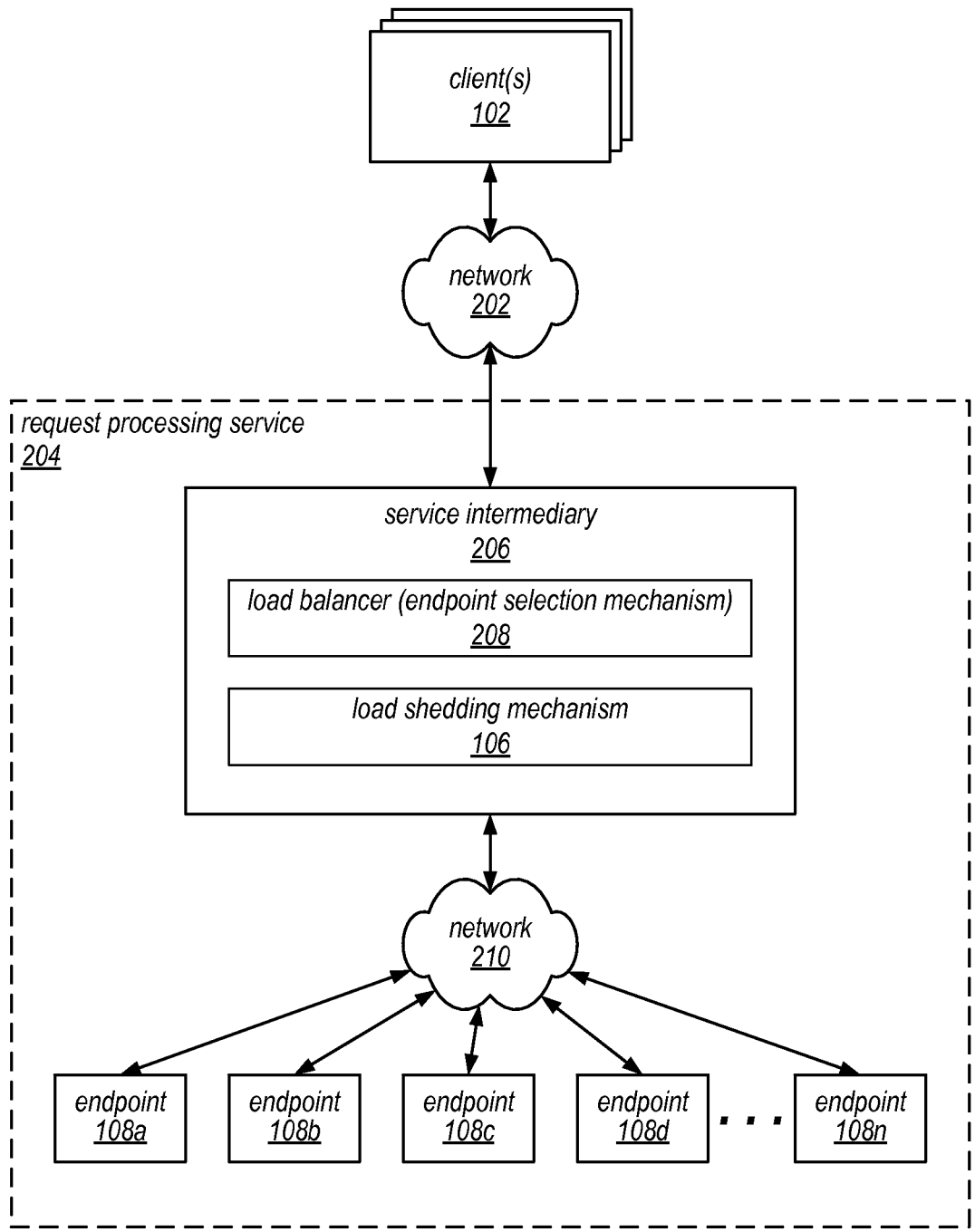
FIG. 2 is a block diagram illustrating a network-based service system architecture that may be configured to process client requests.

FIG. 2 is a block diagram illustrating a network-based service system architecture that may be configured to process client requests. In this example, the system includes the clients 102, the load shedding mechanism 106, and the endpoints 108a-n of FIGS. 1A-1C. However, in other embodiments, the clients 102, the load shedding mechanism 106, the endpoints 108a-n, or any combination thereof differ from the clients, the load shedding mechanism, and the endpoints of FIGS. 1A-1C. The system also includes a network 202, a request processing service 204, a service intermediary 206, a load balancer 208, and a network 210. In the illustrated embodiment, the request processing service 204 includes the service intermediary 206, the network 210, and the endpoints 108a-n, and the service intermediary 206 includes the load balancer 208 and the load shedding mechanism 106. Additionally, the load balancer 208 implements the endpoint selection mechanism 104 of FIGS. 1A-1C. However, as further described below with reference to FIGS.

4-9, other implementations of the endpoint selection mechanism 104, the load shedding mechanism 106, or both may instead be implemented. For example, as described below with reference to FIG. 4, in some embodiments, the request processing service 204 does not include the load balancer 208 and instead a different entity manages the endpoint selection mechanism 104.

As a high-level overview of client packet handling in the distributed load balancer system, one or more clients 102 of the request processing service 204 may connect to the service intermediary 206 (e.g., a border router or a client interface) of the request processing service 204, for example via a network 202 (e.g., an external network such as the Internet). The service intermediary 206 may route incoming packets (e.g., TCP packets) from clients 102 to the endpoints 108a-n via a network 210 (e.g., an internal network or a fabric) as indicated by the load balancer 208. In at least some embodiments, the load balancer 208 may make the routing decisions according to a round robin-based endpoint selection mechanism, a pseudo-random-based endpoint selection mechanism, a fewest connections-based endpoint selection mechanism, or another load balancing endpoint selection mechanism. The network 210 may include one or more networking devices or components including but not limited to switches, routers, and cables. The endpoints 108a-n receive respective packets, set up connections as requested by the clients (e.g., keep-alive connections or other connections) and send client packets in response to requests from the clients 102.

In some embodiments, the request processing service 204 may be a web-based remote storage service where storage devices corresponding to the endpoints 108a-n are used to store data on behalf of the clients 102. The endpoints 108a-n may include the storage devices. Alternatively, the endpoints 108a-n may manage access to some or all of the storage devices. In some embodiments, the endpoints 108a-n may include storage managers configured to encode and decode data stored at the storage devices (e.g., according to a shard-based encryption technique) in response to requests from the clients 102.

Figure 3:
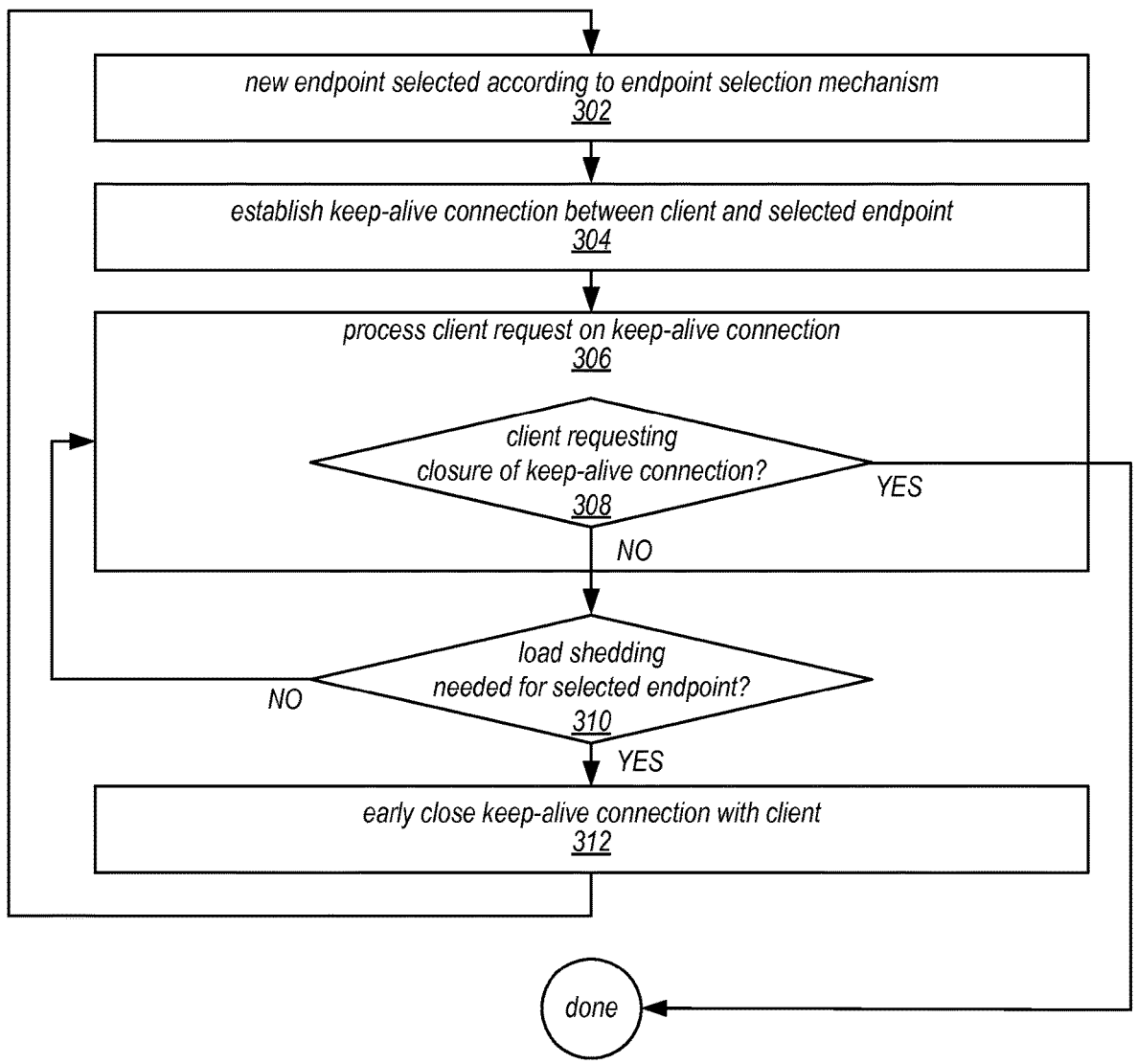
FIG. 3 is a flow diagram illustrating one embodiment of a method for rebalancing a load of an endpoint of a network-based service.

As described above, in one example of a network-based service, a load shedding mechanism may determine that a load shedding operation should be performed at an endpoint. An early close message may trigger termination of a keep-alive connection between the client and the endpoint. Another endpoint may be subsequently be selected according to an endpoint selection mechanism to process additional client requests on another keep-alive connection. One embodiment of a method for rebalancing a load of an endpoint of a network-based service is illustrated by the flow diagram of FIG. 3. Although FIG. 3 illustrates operations being performed in a particular order, in other embodiments, some operations may be performed in other orders or in parallel.

As illustrated at 302, in this example, the method may include selecting a new endpoint according to an endpoint selection mechanism. For example, the endpoint selection mechanism 104 of FIG. 1A may select the endpoint 108b in response to a request for an endpoint from the client 102a. As illustrated at 304, in this example, the method may include establishing a keep-alive connection between the client and the selected endpoint. For example, the keep-alive connection 112 may be established between the endpoint 108b and the client 102a by the endpoint selection mechanism 104, the load shedding mechanism 106, the endpoint 108b, the client 102a, another portion of the request processing service 204 of FIG. 2, or any combination thereof.

As illustrated at 306, in this example, the method may include processing a client request on the keep-alive connection. For example, the endpoint 108b may process request A from the request queue 110 of the client 102a on the keep-alive connection 112. As illustrated at 308, in this example, 306 may include determining whether the client is requesting closure of the keep-alive connection (e.g., as part of the client request). If the client is requesting closure of the keep-alive connection, the method may complete. If the client is not requesting closure of the keep-alive connection (e.g., because the client wishes to make additional requests), as illustrated at 310, in this example, the method may include determining whether load shedding is needed for the selected endpoint. For example, the load shedding mechanism 106 may determine, based at least in part on health information, whether load shedding is needed for the endpoint 108b (e.g., whether the endpoint 108b is overloaded). If load shedding is not needed at the selected endpoint, the method returns to 306.

If load shedding is needed at the selected endpoint, as illustrated at 312, in this example, the method may include early closing the keep-alive connection with the client. For example, the load shedding mechanism 106 may trigger injection of an early close request into a message to the client 102a, causing the client 102a to early close the keep-alive connection 112, as illustrated in FIG. 1B. Then the method may proceed back to 302, where a new endpoint is selected according to the endpoint selection mechanism. As discussed above, in some embodiments, the new endpoint is a different endpoint from the previous endpoint with which the keep-alive connection 112 was closed, though some endpoint selection mechanisms may have a chance of re-selecting the same endpoint. Thus, the method of FIG. 3 may enable rebalancing a load of an endpoint of a network-based service.

Figure 4:
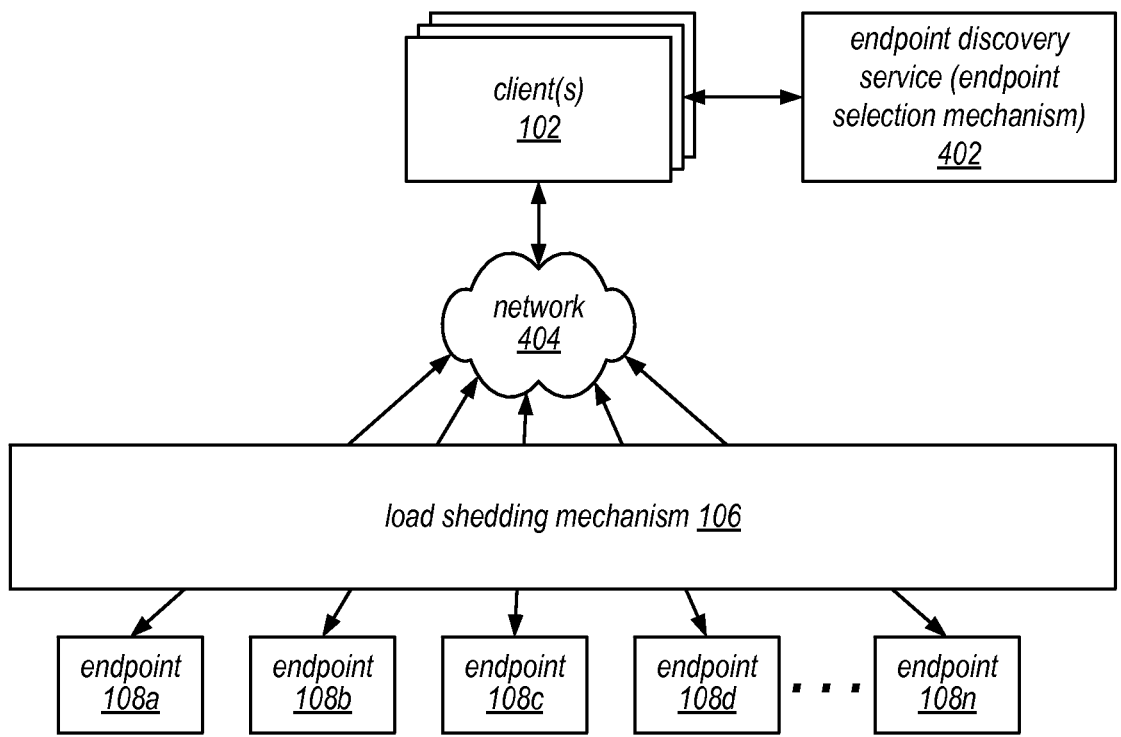
FIG. 4. is a block diagram illustrating an example endpoint selection mechanism implementation in one embodiment of a system that rebalances loads of endpoints of a network-based service.
Figure 5:
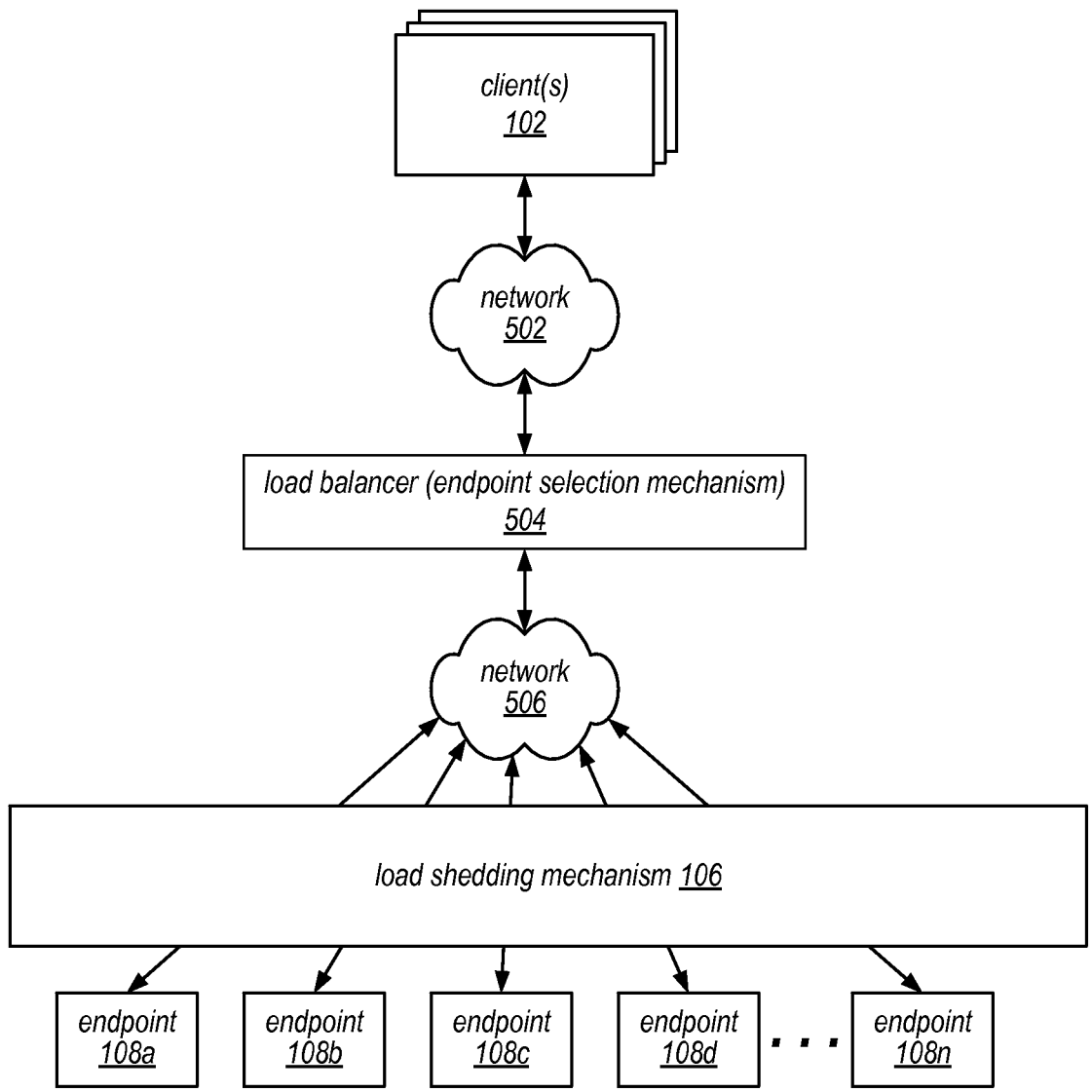
FIG. 5 is a block diagram illustrating an example endpoint selection mechanism implementation in one embodiment of a system that rebalances loads of endpoints of a network-based service.

As described below, FIGS. 4 and 5 illustrate various endpoint selection mechanism implementations. Similarly, FIGS. 6-9 illustrate various load shedding mechanism implementations. Although several specific configurations are illustrated in FIGS. 4-9, in other embodiments, various combinations of implementations may be utilized. For example, the endpoint selection mechanism implementation of FIG. 4 may be utilized in combination with the load shedding mechanism of FIG. 7, although such a combination is not specifically illustrated. Accordingly, although FIGS. 6-9 illustrate a load balancer, in some embodiments, concepts described with reference to FIGS. 6-9 may be used without a load balancer.

FIG. 4 is a block diagram illustrating an example endpoint selection mechanism implementation in one embodiment of a system that rebalances loads of endpoints of a network-based service. In this example, the system includes the clients 102, the load shedding mechanism 106, and the endpoints 108a of FIGS. 1A-1C. However, in other embodiments, the clients 102, the load shedding mechanism 106, the endpoints 108a-n, or any combination thereof differ from the clients, the load shedding mechanism, and the endpoints of FIGS. 1A-1C. The system also includes a network 404 and an endpoint discovery service 402. In some embodiments, the network 404 may correspond to the network 202 of FIG. 2, the network 210, or both. The endpoint discovery service 402 may implement the endpoint selection mechanism 104.

In the illustrated embodiment, the endpoint discovery service 402 is remote to the endpoints 108a-n and the load shedding mechanism 106. In particular, in the illustrated embodiment, the endpoint discovery service 402 is configured to communicate with the clients 102 (e.g., as opposed to communicating with one or more front end devices of the network-based service) and to provide the clients 102 with a method of accessing the endpoints 108*a-n*, such as one or more network addresses corresponding to one or more of the endpoints 108*a-n*. For example, the endpoint discovery service 402 may provide an internet protocol (IP) address for an endpoint (e.g., the endpoint 108*b*) in response to a request from one of the clients 102. In some embodiments, the endpoint discovery service 402 is managed by a different entity from the network-based service (e.g., a different entity from the endpoints 108*a-n*, the load shedding mechanism 106, or both. For example, the endpoint discovery service 402 may be managed by a third party (not the entity that manages the endpoints 108*a-n* and not one of the clients 102). Alternatively, the endpoint discovery service 402 may be managed by one or more of the clients 102 (e.g., a client manages a domain name system (DNS) lookup system that identifies individual endpoints of the endpoints 108*a-n*). In some embodiments, the endpoint discovery service 402 may be co-located with at least one of the clients 102 (e.g., the client 102 may check a local list to select one of the endpoints 108*a-n*).

In various embodiments, the clients 102 may select an endpoint 108*a-n* with which to form a keep-alive connection according to an endpoint selection mechanism and send requests to the selected endpoint via the network 404. However, in some embodiments, the endpoint selection mechanism may be specific to each client (e.g., each client may store information usable to request a keep-alive connection with some or all of the endpoints 108*a-n* and may individually select endpoints according to a local endpoint selection mechanism).

FIG. 5 is a block diagram illustrating another example endpoint selection mechanism implementation in one embodiment of a system that rebalances loads of endpoints of a network-based service. In this example, the system includes the clients 102, the load shedding mechanism 106, and the endpoints 108*a* of FIGS. 1A-1C. However, in other embodiments, the clients 102, the load shedding mechanism 106, the endpoints 108*a-n*, or any combination thereof differ from the clients, the load shedding mechanism, and the endpoints of FIGS. 1A-1C. The system also includes a network 502, a load balancer 504, and a network 506. In some embodiments, the network 502 and the network 506 may respectively correspond to the network 202 and the network 210 of FIG. 2. The load balancer 504 implement the endpoint selection mechanism 104 as described above. In some embodiments, the load balancer 504 may be a distributed load balancer. However, a single load balancer (the load balancer 504) is shown for clarity.

In the illustrated embodiment, the clients 102 send connection requests to the load balancer 504 via the network 502 and the load balancer 504 forwards the connection requests to respective endpoints of the endpoints 108*a-n* via the network 506 in accordance with an endpoint selection mechanism (e.g., a load balancing scheme). Although FIG. 5 illustrates all communications being sent through the load balancer 504, in some embodiments, the keep-alive connection may be established between a client 102 and an endpoint (e.g., the endpoint 108*b*) such that traffic between the endpoint and the client 102 is not routed through the load balancer 504.

Figure 6:
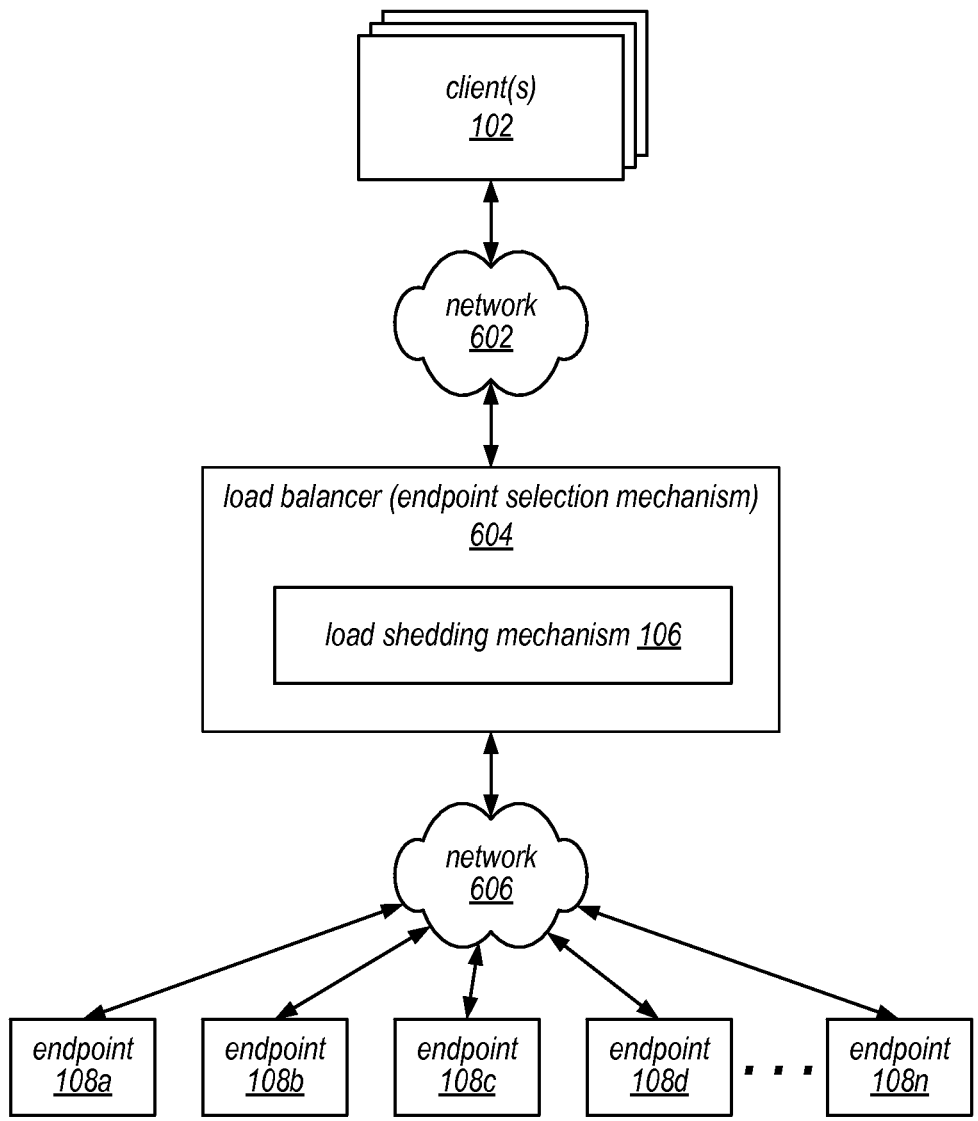
FIG. 6 is a block diagram illustrating an example load shedding mechanism implementation in one embodiment of a system that rebalances loads of endpoints of a network-based service.

FIG. 6 is a block diagram illustrating an example load shedding mechanism implementation in one embodiment of a system that rebalances loads of endpoints of a network-based service. In this example, the system includes the clients 102, the load shedding mechanism 106, and the endpoints 108*a* of FIGS. 1A-1C. However, in other embodiments, the clients 102, the load shedding mechanism 106, the endpoints 108*a-n*, or any combination thereof differ from the clients, the load shedding mechanism, and the endpoints of FIGS. 1A-1C. The system also includes a network 602, a load balancer 604, and a network 606. In the illustrated embodiment, the load balancer 604 includes the load shedding mechanism 106. In some embodiments, the network 602 and the network 606 may respectively correspond to the network 202 and the network 210 of FIG. 2. The load balancer 604 may implement the endpoint selection mechanism 104 as described above. In some embodiments, the load balancer 604 may be a distributed load balancer. However, a single load balancer (the load balancer 604) is shown for clarity.

In the illustrated embodiment, the load shedding mechanism 106 is implemented at the load balancer 604. Accordingly, the load balancer 604 may determine, based at least in part on health information of an associated endpoint, to decrease a load at the endpoint by triggering an early close of a keep-alive connection between one of the clients 102 and the endpoint. In some embodiments, the load balancer 604 may communicate with the endpoints 108*a-n* to assess the health information of the endpoints 108*a-n*. For example, the endpoints 108*a-n* may inform the load balancer 604 of respective temperatures at the endpoints 108*a-n*. Accordingly, as described above with respect to FIG. 5, in some cases, traffic may not be routed through the load balancer 604. In other embodiments, the load balancer 604 may monitor traffic of the endpoints 108*a-n* and determine to decrease the load at a particular endpoint (e.g., the endpoint 108*b*) based on the traffic. For example, the load balancer 604 may monitor respective response latencies of the endpoints 108*a-n* without communicating with the endpoints 108*a-n*. In some embodiments, the particular endpoint may be unaware that the load balancer 604 is decreasing the load at the particular endpoint.

In response to determining to decrease the load at a particular endpoint, the load balancer 604 may trigger the early close(s) by instructing the particular endpoint to insert an early close request into at least one response to at least one of the clients 102. Alternatively, the load balancer 604 may open the at least one response and insert the early close request(s) or may instruct another device to open the at least one response and insert the early close request(s).

Figure 7:
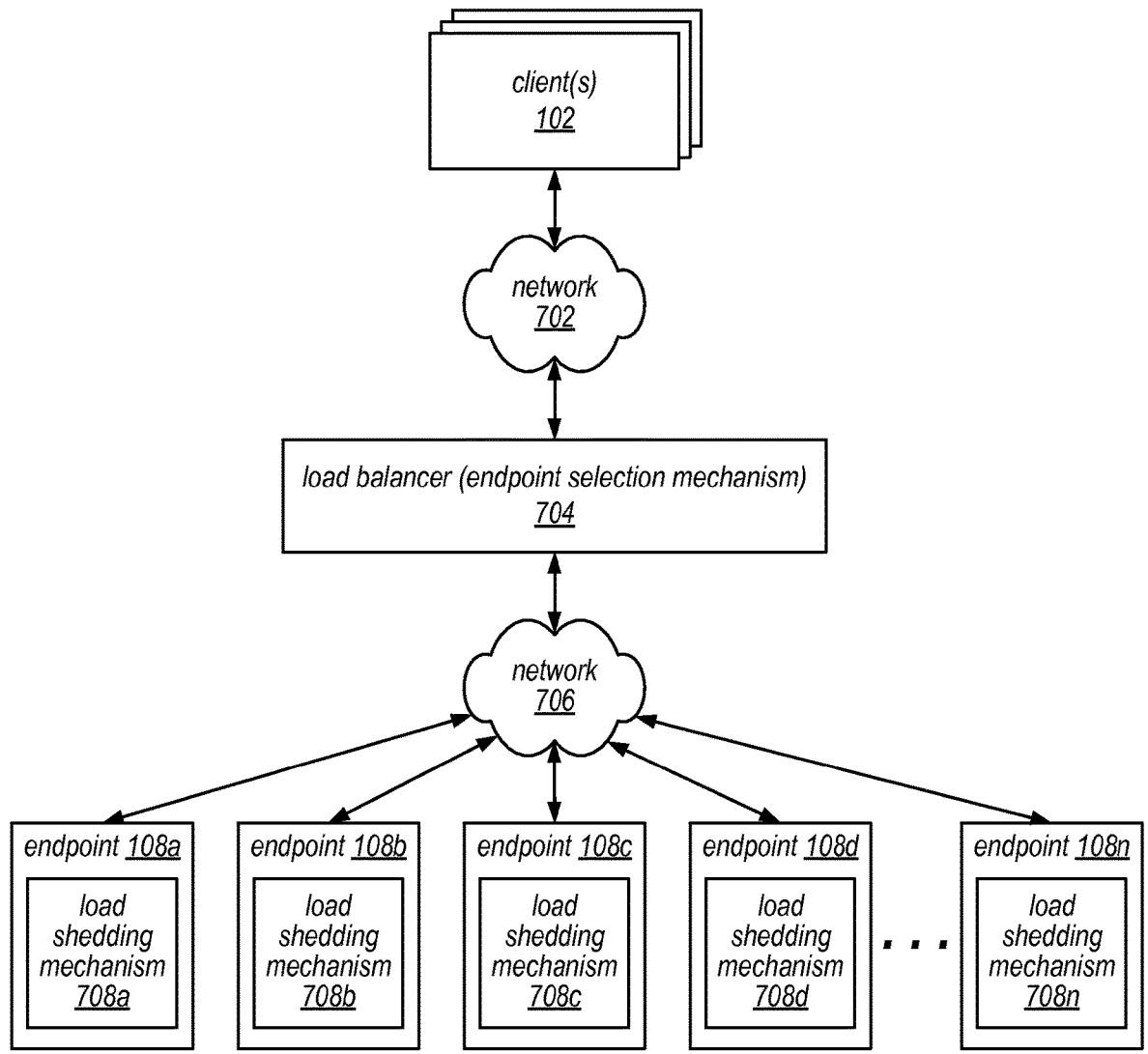
FIG. 7 is a block diagram illustrating an example load shedding mechanism implementation in one embodiment of a system that rebalances loads of endpoints of a network-based service.

FIG. 7 is a block diagram illustrating another example load shedding mechanism implementation in one embodiment of a system that rebalances loads of endpoints of a network-based service. In this example, the system includes the clients 102 and the endpoints 108*a* of FIGS. 1A-1C. However, in other embodiments, the clients 102 the endpoints 108*a-n*, or both differ from the clients and the endpoints of FIGS. 1A-1C. The system also includes a network 702, a load balancer 704, a network 706, and a distributed load shedding mechanism 708*a-n*. In the illustrated embodiment, the endpoints 108*a-n* include respective portions of the distributed load shedding mechanism 708*a-n*. In some embodiments, the distributed load shedding mechanism 708*a-n* corresponds to the load shedding mechanism 106. In some embodiments, the network 702 and the network 706 may respectively correspond to the network 202 and the network 210 of FIG. 2. The load balancer 704 may implement the endpoint selection mechanism 104 as described above. In some embodiments, the load balancer 704 may be a distributed load balancer. However, a single load balancer (the load balancer 704) is shown for clarity.

In the illustrated embodiment, the distributed load shedding mechanisms 708a-n are implemented at respective endpoints of the endpoints 108a-n. Accordingly, each of the endpoints 108a-n may independently determine, based at least in part on respective health information, to decrease a corresponding load by triggering an early close of one or more keep-alive connections. In some embodiments, the endpoints 108a-n may make decisions to decrease corresponding loads without knowledge of loads at other endpoints of the endpoints 108a-n (e.g., because the endpoints 108a-n do not communicate with each other). In other embodiments, the endpoints 108a-n may learn about loads at the other endpoints by communicating with the other endpoints, by communicating with the load balancer 704, or by communicating with another device of the network-based service.

In response to determining to decrease the load, the endpoints 108a-n may be configured to trigger the early close(s) by inserting an early close request into at least one response to at least one of the clients 102. Alternatively, the endpoints 108a-n may instruct another device (e.g., the load balancer 704) to open the at least one response and insert the early close request(s).

Figure 8:
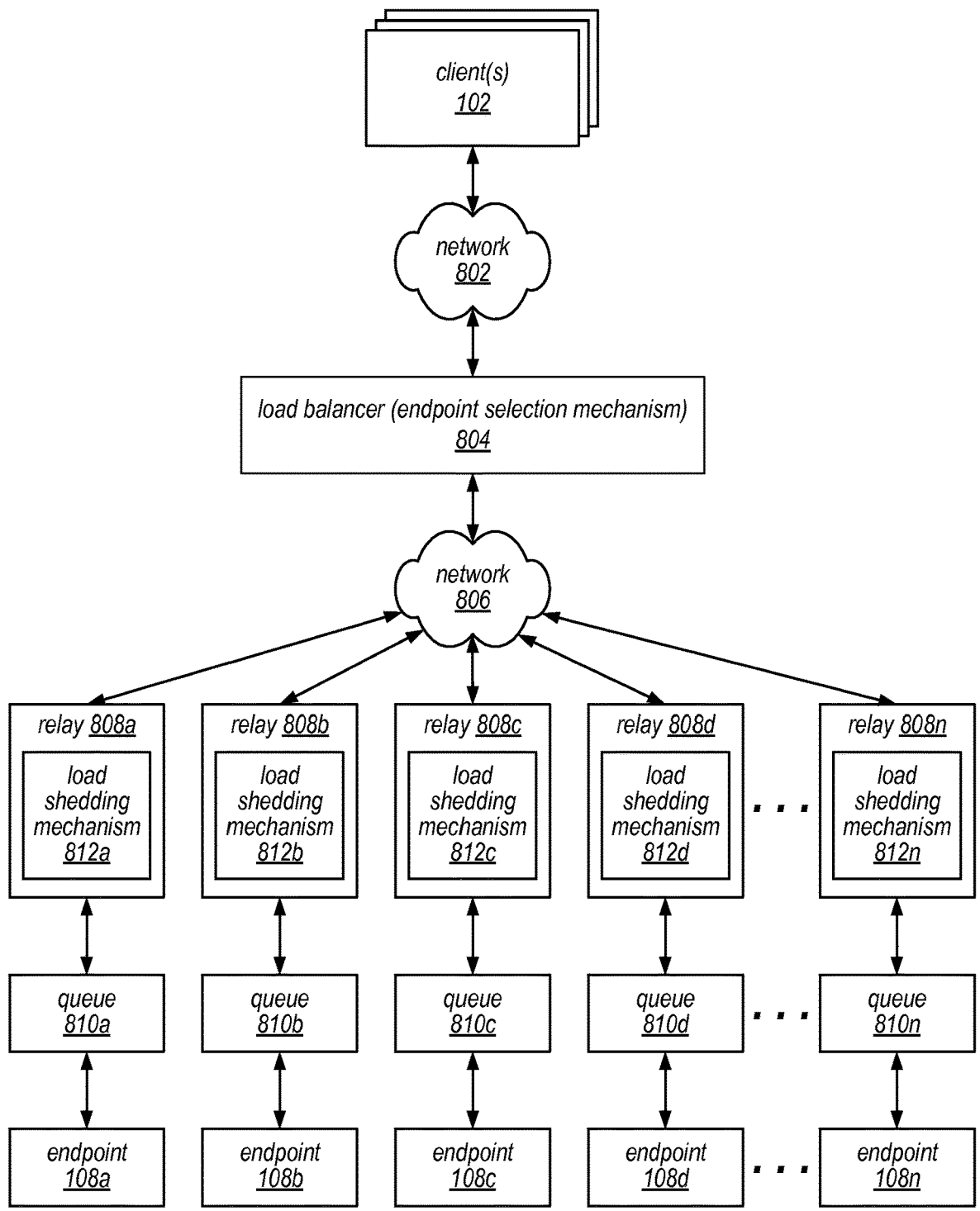
FIG. 8 is a block diagram illustrating an example load shedding mechanism implementation in one embodiment of a system that rebalances loads of endpoints of a network-based service.

FIG. 8 is a block diagram illustrating another example load shedding mechanism implementation in one embodiment of a system that rebalances loads of endpoints of a network-based service. In this example, the system includes the clients 102 and the endpoints 108a of FIGS. 1A-1C. However, in other embodiments, the clients 102 the endpoints 108a-n, or both differ from the clients and the endpoints of FIGS. 1A-1C. The system also includes a network 802, a load balancer 804, a network 806, a plurality of relays 808a-n, a plurality of queues 810a-n, and a distributed load shedding mechanism 812a-n. In the illustrated embodiment, relays 808a-n and the queues 810a-n correspond to the endpoints 108a-n in a one-to-one relationship. However, in other embodiments, other relationships may be utilized. In some embodiments, respective relays, queues, and endpoints may be implemented in a single computing device (e.g., a single server). In the illustrated embodiment, the relays 808a-n include respective portions of the distributed load shedding mechanism 812a-n. In some embodiments, the distributed load shedding mechanism 812a-n corresponds to the load shedding mechanism 106. In some embodiments, the network 802 and the network 806 may respectively correspond to the network 202 and the network 210 of FIG. 2. The load balancer 804 may implement the endpoint selection mechanism 104 as described above. In some embodiments, the load balancer 804 may be a distributed load balancer. However, a single load balancer (the load balancer 804) is shown for clarity.

In the illustrated embodiment, the relays 808a-n represent one or more intermediate devices between the network 806 and the corresponding endpoints 108a-n. The relays 808a-n may route requests that address the respective endpoints 108a-n to respective queues 810a-n. The queues 810a-n may store the requests until the respective endpoints 108a-n are ready to process the requests.

The relays 808a-n may implement corresponding portions of the distributed load shedding mechanism 812a-n for the respective endpoints 108a-n. Accordingly, the relays 808a-n may be configured to determine, based at least in part on health information of the respective endpoints 108a-n, to decrease a load at the respective endpoints 108a-n by triggering an early close of a keep-alive connection between one of the clients 102 and the respective endpoints 108a-n. In some embodiments, the relays 808a-n may communicate with the respective endpoints 108a-n to assess the health information of the respective endpoints 108a-n. For example, the endpoint 108a may inform the relay 808a of a temperatures at the endpoint 108a. In some embodiments, the relays 808a-n may monitor traffic of the respective endpoints 108a-n and determine to decrease the load at the respective endpoints 108a-n based on the traffic. For example, the relays 808a-n may monitor respective response latencies of the endpoints 108a-n without communicating with the endpoints 108a-n. Further, the relays 808a-n may monitor one or more features of the respective queues 810a-n to determine health information of the respective endpoints 108a-n. For example, the relays 808a-n may be configured to determine to decrease a load at the respective endpoints 108a-n based on a number of requests in the respective queues 810a-n. In some embodiments, the relays 808a-n may keep track of loads associated with most common kinds of requests from various clients of the clients 102 and may be configured to determine that the respective endpoints 108a-n are overloaded based on the clients having requests in the respective queues 810a-n.

In response to determining to decrease the load at a particular endpoint, the relays 808a-n may trigger the early close(s) by instructing the respective endpoints 108a-n to insert an early close request into at least one response to at least one of the clients 102. Alternatively, the relays 808a-n may open the at least one response and insert the early close request(s) or may instruct another device to open the at least one response and insert the early close request(s).

Figure 9:
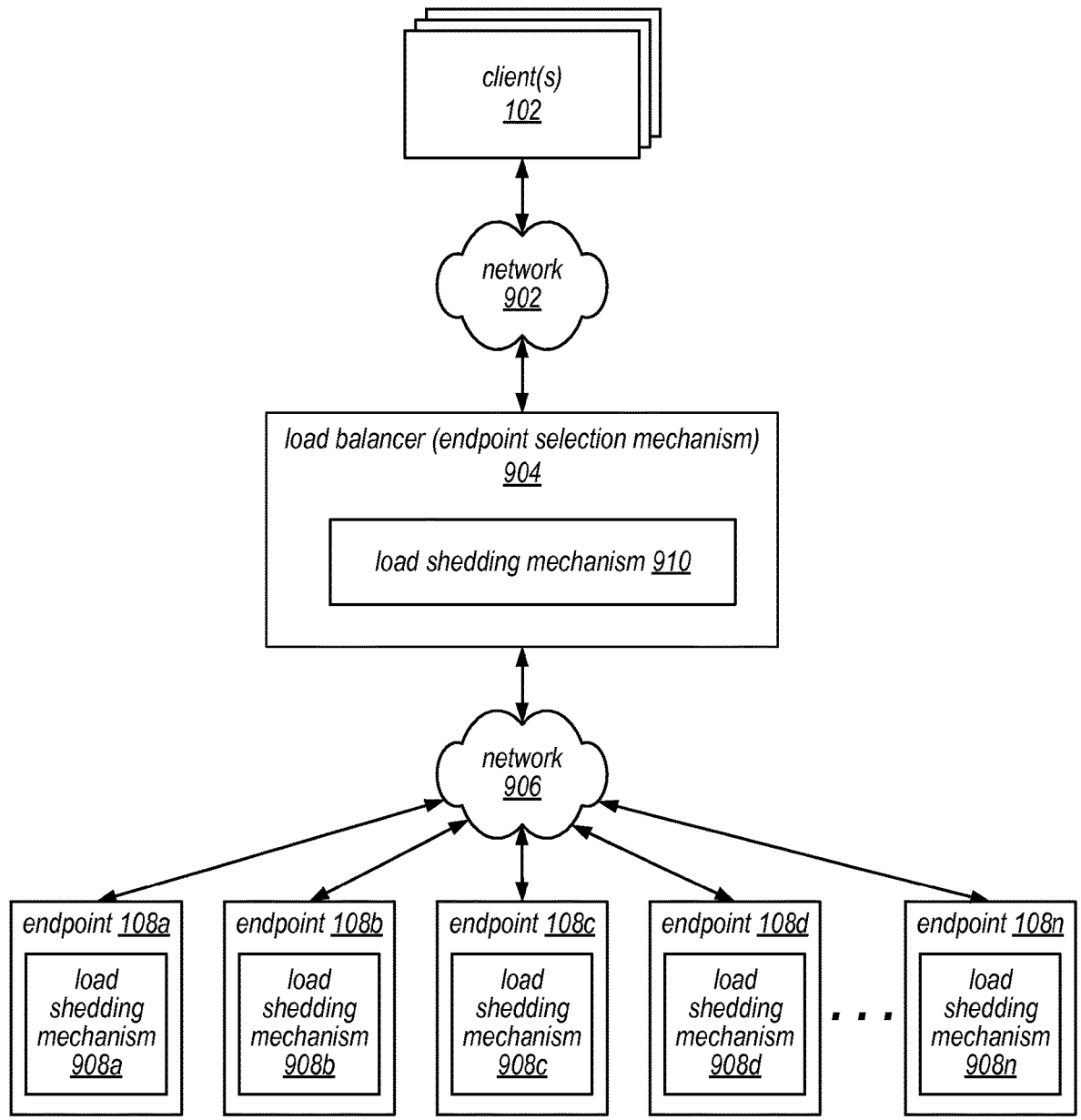
FIG. 9 is a block diagram illustrating an example load shedding mechanism implementation in one embodiment of a system that rebalances loads of endpoints of a network-based service.

FIG. 9 is a block diagram illustrating another example load shedding mechanism implementation in one embodiment of a system that rebalances loads of endpoints of a network-based service. In this example, the system includes the clients 102 and the endpoints 108a of FIGS. 1A-1C. However, in other embodiments, the clients 102 the endpoints 108a-n, or both differ from the clients and the endpoints of FIGS. 1A-1C. The system also includes a network 902, a load balancer 904, a network 906, a distributed load shedding mechanism 908a-n, and a load shedding mechanism 910. In the illustrated embodiment, the endpoints 108a-n include respective portions of the distributed load shedding mechanism 908a-n and the load balancer 904 includes the load shedding mechanism 910. In some embodiments, the distributed load shedding mechanism 908a-n and the load shedding mechanism 910, in combination, correspond to the load shedding mechanism 106. In some embodiments, the network 902 and the network 906 may respectively correspond to the network 202 and the network 210 of FIG. 2. The load balancer 904 may implement the endpoint selection mechanism 104 as described above. In some embodiments, the load balancer 904 may be a distributed load balancer. However, a single load balancer (the load balancer 904) is shown for clarity.

In the illustrated embodiment, the distributed load shedding mechanisms 908a-n are implemented at respective endpoints of the endpoints 108a-n. Accordingly, the distributed load shedding mechanisms 908a-n may be configured to detect some of the factors described above of the health information for the respective endpoints 108a-n. Additionally, the load shedding mechanism 910 may be configured to detect the same or different factors described above of the health information for the endpoints 108a-n. For example, the distributed load shedding mechanism 908a-n may detect one or more factors regarding the respective endpoints 108a-n, such as temperatures at the respective endpoints 108a-n, and the load shedding mechanism 910 may detect one or more different factors, such as response latencies corresponding to the respective endpoints 108a-n. Alternatively, in some embodiments, one of the distributed load shedding mechanism 908a-n and the load shedding mechanism 910 may determine to decrease the load at one or more endpoints and the other of the distributed load shedding mechanism 908a-n and the load shedding mechanism 910 may trigger an early close of one or more keep-alive connections at the one or more endpoints. For example, the load shedding mechanism 910 may determine to decrease a load at the endpoint 108a and the distributed load shedding mechanism 908a may inject one or more early close requests into one or more responses corresponding to one or more keep-alive connections.

Figure 10:
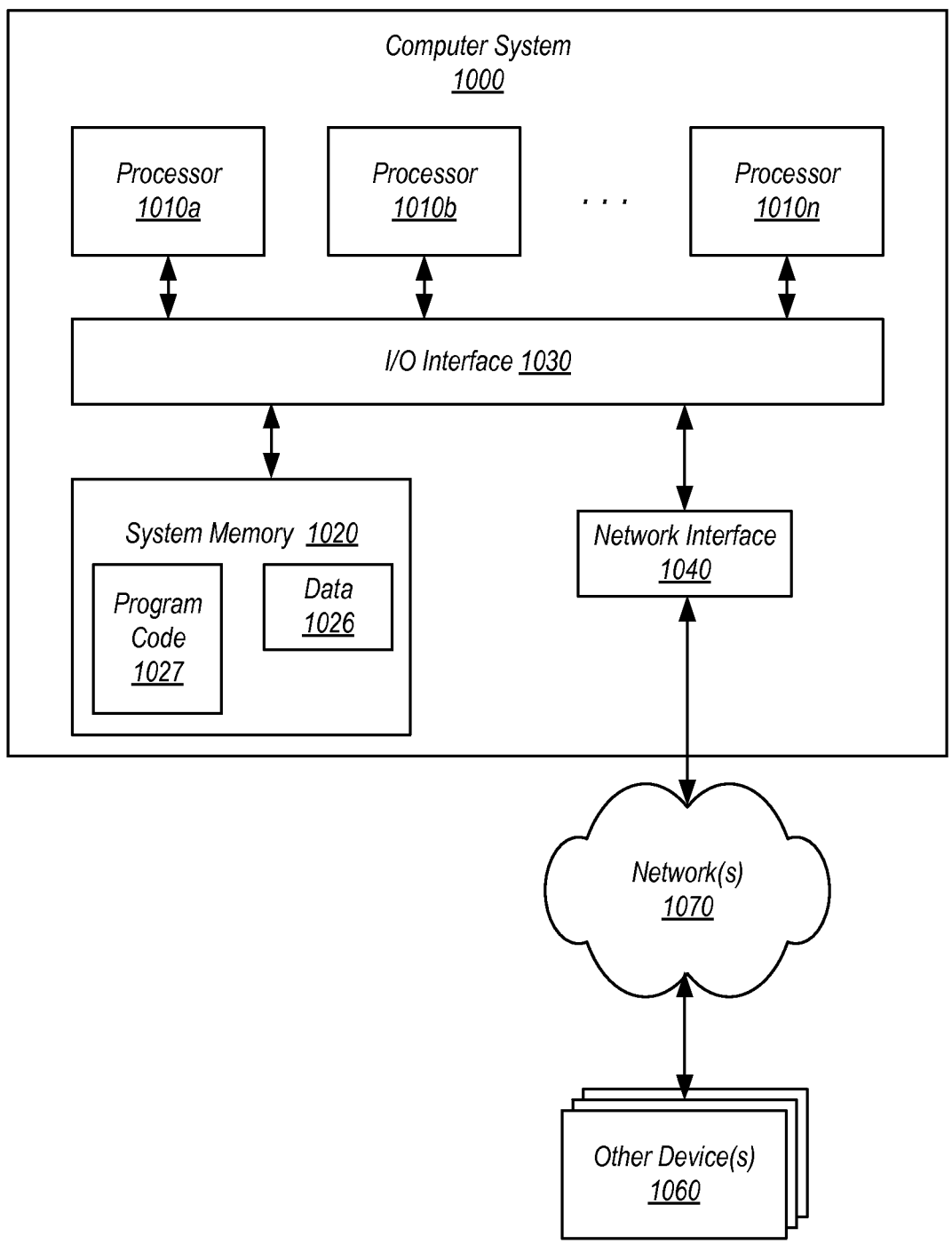
FIG. 10 is a block diagram illustrating one embodiment of a computer system configured to implement at least a portion of a system that rebalances loads of endpoints of a network-based service, as described herein.

One embodiment of a computer system configured to implement at least a portion of a system that rebalances loads of endpoints of a network-based service (e.g., the endpoint selection mechanism 104, the load shedding mechanism 106, or both) as described above with reference to FIGS. 1A-9 is shown in FIG. 10. In at least some embodiments, a server that implements a portion or all of the methods and apparatus for load rebalancing in a network-based system as described herein may include a general-purpose computer system that includes or is configured to access one or more computer-accessible media, such as a computer system 1000 illustrated in FIG. 10. In the illustrated embodiment, the computer system 1000 includes one or more processors 1010a-n coupled to a system memory 1020 via an input/output (I/O) interface 1030. The computer system 1000 further includes a network interface 1040 coupled to the I/O interface 1030.

In various embodiments, the computer system 1000 may be a uniprocessor system including one processor 1010a, or a multiprocessor system including several processors 1010a-n (e.g., two, four, eight, or another suitable number). The processors 1010a-n may be any suitable processors capable of executing instructions. For example, in various embodiments, the processors 1010a-n may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010a-n may commonly, but not necessarily, implement the same ISA.

System memory 1020 may be configured to store instructions and data accessible by the processor(s) 1010. In various embodiments, the system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for rebalancing loads of endpoints of a network-based service, are shown stored within the system memory 1020 as program code 1027 and data 1026. For example, the program code 1027 may, when executed by a processor, cause the processor to implement at least a portion of functions of the endpoint selection mechanism 104, the load shedding mechanism 106, or any combination thereof.

In one embodiment, the I/O interface 1030 may be configured to coordinate I/O traffic between a processor 1010, the system memory 1020, and any peripheral devices in the device, including the network interface 1040 or other peripheral interfaces. In some embodiments, the I/O interface 1030 may perform any necessary protocol, timing or other data transformations to convert data signals from one component (e.g., the system memory 1020) into a format suitable for use by another component (e.g., a processor 1010). In some embodiments, the I/O interface 1030 may include support for devices attached through various types of peripheral buses, such as a variant of the Peripheral Component Interconnect (PCI) bus standard or the Universal Serial Bus (USB) standard, for example. In some embodiments, the function of the I/O interface 1030 may be split into two or more separate components, such as a north bridge and a south bridge, for example. Also, in some embodiments some or all of the functionality of the I/O interface 1030, such as an interface to the system memory 1020, may be incorporated directly into a processor 1010.

The network interface 1040 may be configured to allow data to be exchanged between the computer system 1000 and other devices 1060 attached to a network or networks 1070, such as other computer systems or devices as illustrated or described in FIGS. 1A through 9, for example. In various embodiments, the network interface 1040 may support communication via any suitable wired or wireless general data networks, such as types of Ethernet network, for example. Additionally, the network interface 1040 may support communication via telecommunications/telephony networks such as analog voice networks or digital fiber communications networks, via storage area networks such as Fibre Channel SANs, or via any other suitable type of network and/or protocol.

In some embodiments, the system memory 1020 may be one embodiment of a computer-accessible medium configured to store program instructions and data as described above for FIGS. 1A through 9 for implementing embodiments of load rebalancing of endpoints of a network-based service (e.g., distributed storage systems). However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to the computer system 1000 via the I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of the computer system 1000 as the system memory 1020 or another type of memory. Further, a computer-accessible medium may include transmission media or signals such as electrical, electromagnetic, or digital signals, conveyed via a communication medium such as a network and/or a wireless link, such as may be implemented via the network interface 1040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more processors and memory to implement a network-based service, the network-based service comprising:
an endpoint selection mechanism implemented on one or more computer devices configured to, in response to a service request of a client:
select an endpoint; and
establish a keep-alive connection between the client and the selected endpoint;
a plurality of endpoints implemented on one or more respective servers, wherein individual ones of the plurality of endpoints are configured to:
maintain one or more keep-alive connections with one or more respective clients; and
receive requests from the one or more respective clients via the one or more keep-alive connections; and
a load shedding mechanism configured to:
monitor health information of one or more endpoints of the plurality of endpoints, wherein the health information comprises load information indicative of respective loads of the one or more endpoints;
determine, based at least in part on the health information of a particular endpoint that is active, whether to perform a load shedding operation for the particular endpoint of the one or more endpoints; and
in response to determining to perform the load shedding operation for the particular endpoint, prior to a client close request for a corresponding keep-alive connection, trigger an early close of the corresponding keep-alive connection between the particular endpoint and a client,
wherein, in response to the client attempting to reconnect based at least in part on the early close of the keep-alive connection between the particular endpoint and a client, the endpoint selection mechanism is configured to select, based at least in part on the load information indicative of respective loads of the one or more endpoints, another endpoint of the plurality of endpoints to reconnect with the client, wherein the load of the other endpoint is less than a load of the particular endpoint.

2. The system of claim 1, wherein the health information for the particular endpoint comprises one or more of a plurality of factors, including:
whether a processor utilization at the particular endpoint exceeds a utilization threshold,
whether a bandwidth at the particular endpoint exceeds a bandwidth threshold,
whether a latency at the particular endpoint exceeds a latency threshold,
whether an estimated connection establishment time of the particular endpoint exceeds a connection establishment rate threshold,
whether a packet loss rate of the particular endpoint exceeds a packet loss threshold,
whether an input/output error rate of the particular endpoint exceeds an error rate threshold,
whether a number of processes running at the particular endpoint exceeds a process count threshold,
whether a percentage of messages of a particular type being sent on the keep-alive connection exceeds a particular message type threshold,
whether a temperature of the endpoint exceeds a temperature threshold,
whether an estimated request fulfillment time associated with the particular endpoint exceeds a fulfillment threshold, or
any combination thereof.

3. The system of claim 1, wherein respective portions of the load shedding mechanism are implemented on respective endpoints of the plurality of endpoints.

4. The system of claim 1, wherein at least a portion of the load shedding mechanism and the endpoint selection mechanism are implemented on one or more load balancers of the network-based service.

5. The system of claim 1, wherein a portion of the load shedding mechanism is implemented on respective endpoints of the plurality of endpoints,
wherein another portion of the load shedding mechanism is implemented on one or more load balancers of the network-based service, and
wherein, for the particular endpoint, at least one of a plurality of factors of the health information is monitored by the portion of the load shedding mechanism implemented on the particular endpoint, and at least one of the plurality of factors is monitored by the other portion of the load shedding mechanism implemented on the one or more load balancers.

6. A method, comprising:
maintaining, at a selected endpoint of a plurality of endpoints of a network-based service, a keep-alive connection between a client and the selected endpoint;
receiving, at the selected endpoint, one or more requests from the client;
determining, at one or more computer devices of the service, to decrease a load at the selected endpoint while the selected endpoint is active, wherein the determining to decrease the load at the selected endpoint is based at least in part on health information for the selected endpoint, wherein the health information comprises load information indicative of respective loads of one or more endpoints of the plurality of endpoints; and
prior to receiving a client close request for the keep-alive connection, in response to determining to decrease the load at the selected endpoint, triggering, by the one or more computer devices, an early close of the keep-alive connection,
wherein, in response to the client attempting to reconnect based at least in part on the early close of the keep-alive connection between the selected endpoint and the client, a connection selection mechanism selects, based at least in part on the load information, another endpoint of the plurality of endpoints to reconnect with the client, wherein the load of the other endpoint is less than a load of the selected endpoint.

7. The method of claim 6, wherein determining to decrease the load comprises determining:
whether a processor utilization at the selected endpoint exceeds a utilization threshold,
whether a bandwidth at the selected endpoint exceeds a bandwidth threshold,
whether a latency at the selected endpoint exceeds a latency threshold, whether an estimated connection establishment time of the selected endpoint exceeds a connection establishment rate threshold, whether a packet loss rate of the selected endpoint exceeds a packet loss threshold, whether an input/output error rate of the selected endpoint exceeds an error rate threshold, whether a number of processes running at the selected endpoint exceeds a process count threshold, whether a percentage of messages of a particular type being sent on the keep-alive connection exceeds a particular message type threshold, whether a temperature of the selected endpoint exceeds a temperature threshold, whether an estimated request fulfillment time associated with the selected endpoint exceeds a fulfillment threshold, or any combination thereof.

8. The method of claim 6, wherein the selecting the other endpoint comprises the client identifying the other endpoint using an endpoint discovery service.

9. The method of claim 8, wherein the endpoint discovery service is managed by a different entity than the network-based service, and wherein the different entity stores one or more network addresses corresponding to one or more endpoints of the network-based service.

10. The method of claim 6, wherein the other endpoint is different from the selected endpoint.

11. The method of claim 10, wherein the other endpoint is selected from the plurality of endpoints using a round robin-based endpoint selection mechanism.

12. The method of claim 10, wherein the other endpoint is selected from the plurality of endpoints using a pseudo-random-based endpoint selection mechanism.

13. The method of claim 10, further comprising maintaining, by the network-based service, load information indicative of a plurality of loads corresponding to the plurality of endpoints.

14. The method of claim 6, further comprising:

receiving, at a relay of the selected endpoint, the one or more requests; and sending, by the relay, the one or more requests to a queue of the selected endpoint, wherein the relay is implemented by at least some of the one or more computer devices, and wherein the determining to decrease the load at the selected endpoint is performed at the relay.

15. The method of claim 14, wherein the relay performs the triggering the early close of the keep-alive connection by inserting an early close request into a response from the selected endpoint to the client.

16. The method of claim 15, wherein the relay determines to decrease the load at the selected endpoint and to trigger the early close of the keep-alive connection without receiving an indication from the selected endpoint regarding the load at the selected endpoint.

17. A non-transitory, computer-readable storage medium storing program instructions that, when executed on one or more processors, cause the one or more processors to:

implement a load shedding mechanism configured to:

maintain a keep-alive connection between a client and a selected endpoint of a plurality of endpoints of a network-based service;

determine, based at least in part on health information for the selected endpoint that is active, to decrease a load at the selected endpoint, wherein the health information comprises load information indicative of respective loads of one or more endpoints of the plurality of endpoints; and prior to receiving a client close request for the keep-alive connection, in response to determining to decrease the load at the selected endpoint, trigger an early close of the keep-alive connection, wherein, in response to the client attempting to reconnect based at least in part on the early close of the keep-alive connection between the selected endpoint and the client, a connection selection mechanism selects, based at least in part on the load information, another endpoint of the plurality of endpoints to reconnect with the client, wherein the load of the other endpoint is less than a load of the selected endpoint.

18. The non-transitory, computer-readable storage medium of claim 17, wherein, to determine to decrease the load, the load shedding mechanism is configured to determine:

whether a processor utilization at the selected endpoint exceeds a utilization threshold, whether a bandwidth at the selected endpoint exceeds a bandwidth threshold, whether a latency at the selected endpoint exceeds a latency threshold, whether an estimated connection establishment time of the selected endpoint exceeds a connection establishment rate threshold, whether a packet loss rate of the selected endpoint exceeds a packet loss threshold, whether an input/output error rate of the selected endpoint exceeds an error rate threshold, whether a number of processes running at the selected endpoint exceeds a process count threshold, whether a percentage of messages of a particular type being sent on the keep-alive connection exceeds a particular message type threshold, whether a temperature of the selected endpoint exceeds a temperature threshold, whether an estimated request fulfillment time associated with the selected endpoint exceeds a fulfillment threshold, or any combination thereof.

19. The non-transitory, computer-readable storage medium of claim 17, wherein the load shedding mechanism is further configured to:

maintain message load information corresponding to one or more previous requests using a plurality of keep-alive connections connected to the selected endpoint; and in response to determining to decrease the load, select the keep-alive connection from the plurality of keep-alive connections based at least in part on the message load information, wherein one or more other keep-alive connections of the plurality of keep-alive connections are not closed in response to the determining to decrease the load at the selected endpoint.

20. The non-transitory, computer-readable storage medium of claim 19, wherein the load shedding mechanism is further configured to, in response to determining to decrease the load at the selected endpoint, close at least some other keep-alive connections of the plurality of keep-alive connections based at least in part on corresponding message load information.

21. The non-transitory, computer-readable storage medium of claim 17, wherein the early close of the keep-alive connection comprises injecting an early close request into a response from the selected endpoint to the client before a subsequent request is received from the client such that the early close of the keep-alive connection is not interpreted as an error by the client.

* * * * *